Figure 1:
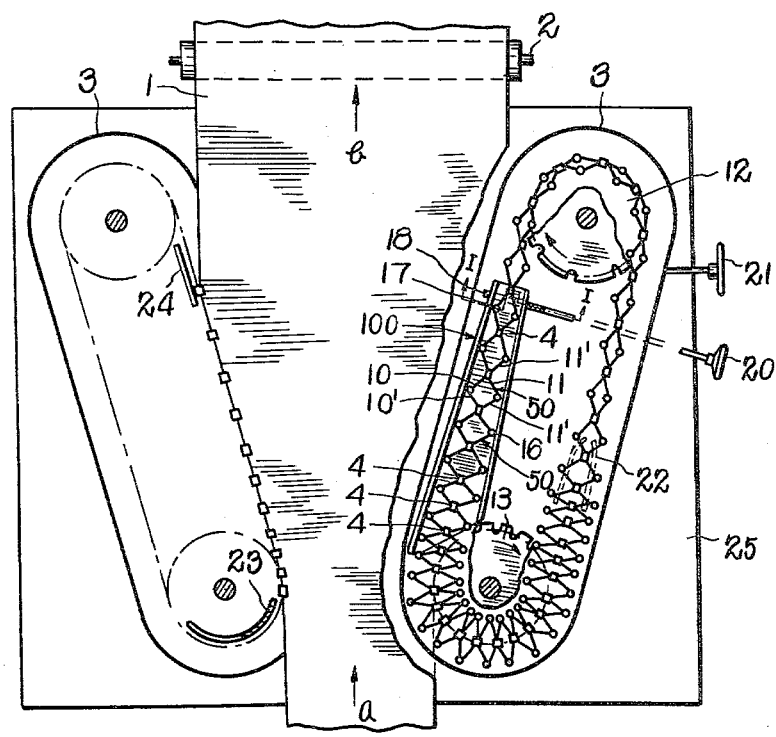

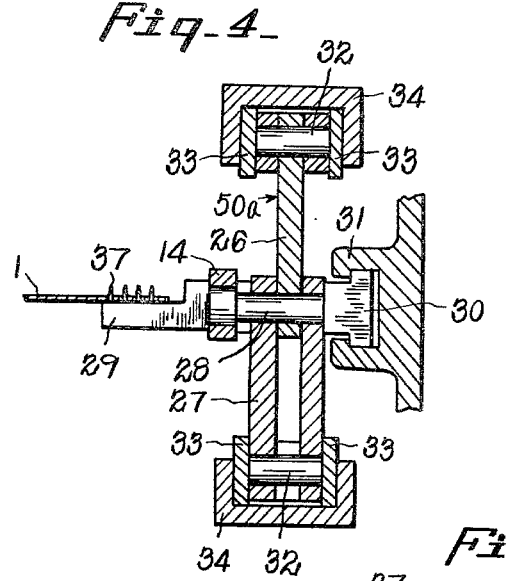
Fig-4-
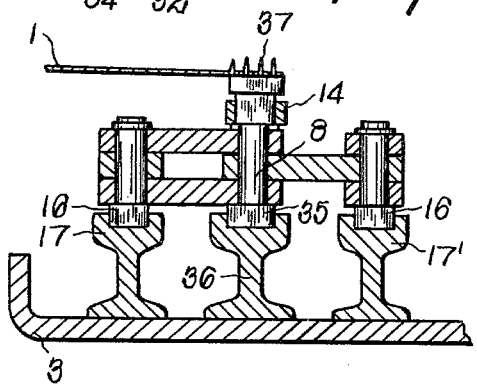
Fig-5-

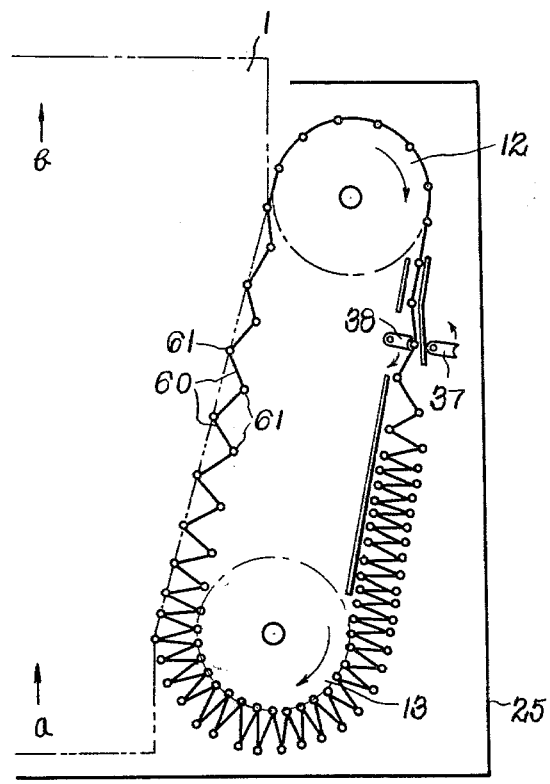

3,195,177
APPARATUS FOR STRETCHING THERMO-
PLASTIC FILM
Mitsuaki Kawamura, Oaza-Moriyama, Moriyama-shi, Aichi-ken, and Seiichi Nakagawa, Sotoboricho, Higashi-ku, Nagoya, Japan, assignors to Shin-Mitsubishi Jukogyo Kabushiki Kaisha, Tokyo, Japan
Filed July 26, 1962, Ser. No. 212,594
Claims priority, application Japan, Aug. 6, 1961, 36/28,543
5 Claims. (Cl. 18—1)

This invention relates to stretching apparatus for thermoplastic film, and particularly to an improvement of apparatus which operates to stretch thermo-plastic film in both a longitudinal direction and a lateral direction simultaneously.

It is generally known that when thermo-plastic film, such as polyethylene, polyethylene-terephthalate, polypropylene and the like, is stretched under suitable temperature conditions, a crystalline structure will be produced in arrays in the extending direction, thereby elevating their mechanical properties. A uniform film, having no directionality in mechanical properties thereof, may be obtained by combining longitudinal stretch (in travelling direction of film) and lateral stretch (in perpendicular direction relative to the travelling direction) in such a way that arrays of crystalline structure will then be produced at an angle of about 45° relative to the film's travelling direction. In conventional methods, in order to obtain such arrays of crystalline structure, the film has in a first stage been stretched in a longitudinal direction and then in a lateral direction. However, such a double-stage operation requires duplication of work while sometimes it is not possible to obtain uniform stretching in both directions due to the nature of the resins to be stretched. It is therefore preferable to perform these longitudinal and lateral stretches simultaneously. For this purpose, an improvement has been contemplated by providing apparatus having a plurality of clamps for grasping the opposed edges of film which are movable simultaneously in longitudinal and lateral directions relative to the travelling direction of the film respectively.

An object of this invention is to provide apparatus enabling simultaneous longitudinal and lateral stretching of film as the latter is being advanced.

It is a further objection of the invention to permit easy and stepless adjustment of respective longitudinal and lateral stretch rates even during operation.

According to this invention, a plurality of links are connected together to form an endless chain loop which is expandable and contractable. Holding means are provided at the couplings or joints of each link for engaging side edges of the film. The links between connecting joints-pitches of the links are changeable, array of links adjacent the side edges of the film are disposed outwardly flared relative to the travel direction of the film are driven in such a way that the distance between adjacent pivots in the train increase in the travel direction of the film. The links may be connected end-to-end and be in the form of a zigzag continuous line, or the links may be connected together to form successions of quadrilaterals.

In the latter case, the film holding means are preferably mounted at the pivots which connect relatively adjoining quadrilaterals.

Further, in this invention, guide means are provided to guide the said chain loop in an outwardly oblique relation to the travel direction of the film and increasingly expand the chain in the travel direction of the film. This guide means may include a couple of guide rail members arranged with an inclination relative to each other, respectively engaged with the train of link joints adjacent the edge side of film and the train of link joints on the outside thereof, thereby insuring gradual expansion of the distances between adjacent pivots. By changing the relative gradient of each guide rail, the longitudinal stretching rate of film may be freely adjusted even during operation. In addition, the lateral stretching rate may be adjusted by changing the relative angles between the pairs of rails, or between the base frames which support the endless chain link train on the right side and that on the left side.

Further, in this invention, only lower speed chain gears and higher speed chain gears need be utilized and can themselves constitute guide means. The gears are respectively positioned at the incoming end and at the outgoing end of said travelling chain loop and the gears are located along lines which diverge in the direction of travel of the film. The distance between adjacent pivots of the links of said endless chain loop increase in the travel direction of the film in accordance with the speed difference between the chain gears. Furthermore, adjusting means to regulate the angle between the coupled guide rail members may be employed.

The above and other objects and advantages of this invention will become apparent from the following description of embodiments of this invention, reference being made to the accompanying drawings, wherein.

Figure 2:
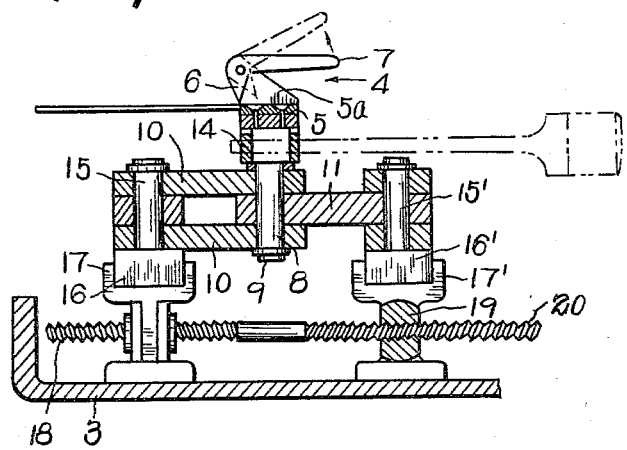
Figure 3:
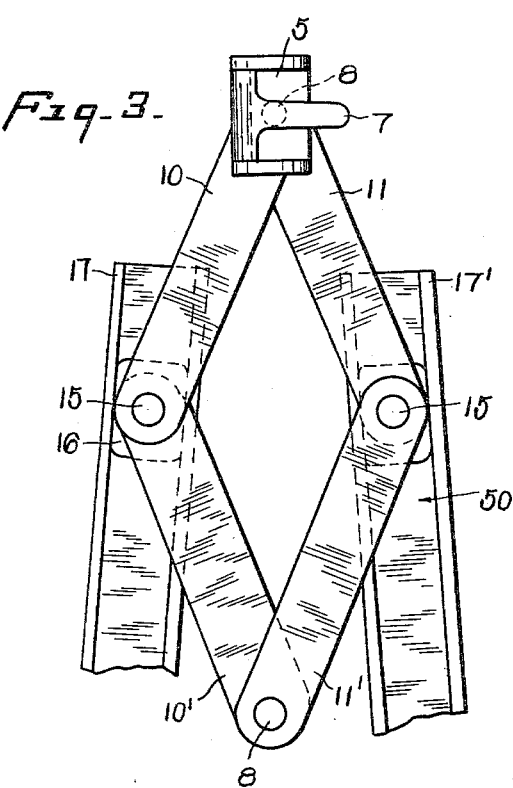

FIG. 1 is a view in elevation of an embodiment of the invention, the right side of which is shown broken away, FIG. 2 is a section taken on line 1—1 of FIG. 1, FIG. 3 is a partial elevational view of FIG. 2, FIG. 4 is a vertical sectional view of other embodiment of link members of horizontal type, FIG. 5 is a vertical sectional view of a further embodiment of holding means, and FIG. 6 is a partial view in elevation of a further embodiment using a single joint link.

In FIG. 1, the film 1 travels inside a heating chamber 25 from "*a* to *b*" in the direction shown by the arrows from *a* to *b*. The film undergoes stretching in the chamber 25. After leaving the heating chamber 25 the film is cooled by a suitable cooling roll 2. The stretching apparatus is generally designated by numerals 100 in FIG. 1. A stretching device is arranged on each of the opposite sides of film 1 symmetrically relative to the direction of travel thereof. The stretching devices are supported respectively on the rightside and leftside base frames 3. In order to simplify the drawings, the stretching apparatus on the left in FIG. 1 is shown diagrammatically, but its structure is similar to the stretching apparatus shown broken away on the right of FIG. 1. Accordingly, description will be made mainly with reference to the stretching apparatus on the rightside only.

Stretching apparatus 100 consists of a number of link members 50 succeedingly connected with each other to form an endless chain loop. Each link member 50 consists of links 10, 10' on one side and links 11, 11' on the other side which are connected with each other to form a pantograph or a diamond shape.

As shown in detail in FIGS. 2 and 3, the links 10, 10' on one side of the link members 50 are connected with each other by means of pivots 15 while the links 11, 11' on the other side are connected by pivots 15'. The opposite ends of the links 10 and 11 and those of the links 10' and 11' are respectively connected by pivots 8. Concurrently, the pivot 8 serves as a connecting pivot for the end of the links 10, 11 of link member 50 on one hand and the end of the links 10', 11' of adjoining link member 50 on the other hand. In this way, the link member 50 is succeedingly connected by pivots 8 to form an endless chain loop with changeable pitch and thus pivots 15, 15' and 8 serve as connecting coupling of link members. 9 are stopper for pivots 8.

On the top of pivots 8, there is provided holding means 4 for engaging the side edge of film 1. Holding means 4 is, as shown in FIG. 2, secured on the top of pivot 8 and comprises stand 5 having upward obliquely projecting arms 5a, a nipping element 6 engaged with the upper plane of the stand 5 and a lever 7 pivotally connected to the top of the arms 5a by a pin. When the lever 7 is lowered, the nipping element 6 holds the side edge of film 1 against the stand 5 and when the lever 7 is raised, the nipping element 6 releases the film 1. Movement of this lever 7 is regulated by cams 23 and 24 (FIG. 1) as mentioned below.

The upper part of the pivot 8 is rotatably inserted in the outer shell 14, which is adapted for meshing with the teeth of gear 13 and gear 12, for thereby driving the link members 50 connected in the endless chain loop to the direction shown by the arrows in FIG. 1. By adjusting the speed of revolution of the gear 12 at the outgoing end to be higher than that of gear 13 at the oncoming end, the array of link members facing the edge of the film are elongated.

On the lower ends of the pivot 15 connecting the links 10, 10' on the leftside of link members 50 and of the pivot 15' connecting the links 11, 11' on the rightside there are respectively provided sliding elements 16, 16' which are engaged in guide means.

The guide means consists of guide rails 17, 17' which are positioned at the lower part of the endless chain loop constituted by the link members 50 connected with each other, on the reach of the loop adjacent side edge 1 of the film. The guide rails 17 and 17' receive in the grooves thereof the said sliding elements 16 and 16' slidably, and the distance between the guide rails 17 and 17' is gradually reduced from the incoming end for the film to the outgoing end. Therefore, as shown in FIG. 1, as the link members travel along guide rails 17, 17', pivots 15, 15' on the opposed sides of link members 50 are positively urged towards one another by respective guide rails 17 and 17', causing said link members to form diamonds of gradually longer shape in the direction of travel so that distance between adjacent joints of link members 50, or the distance between adjacent holding means 4 gradually increases from the incoming end to outgoing end. As a consequence thereof the engaged film will be elongated in two directions as the film advances.

The ends of guide rails 17 and 17' facing the incoming end of the film are rotatably supported on the base frame 3 so that the relative spacing between rails 17 and 17' may be varied. The end of each guide rail which is closer to the outgoing end is engaged by a screw rod 18 and a spherical bushing 19, the screw rod 18 having right and left hand threads respectively engaged in the guide rails 17 and 17'. Therefore, by turning one end of the handle 20 of the screw rod 18, the guide rails 17 and 17' move concurrently away from one another to thereby adjust the angle between the rails 17 and 17' and accordingly the variation of longitudinal stretch proportion of the film 1. Each of the chain gears 12 and 13 has a different speed of revolution in accordance with the longitudinal stretch ratio, and when this stretch ratio is to be changed, their speeds must be changed by suitable means (not shown). Further, the operation of the handle 21, by well known means using opening and closing devices (not shown), varies the angle between the left and right base frames 3, thereby varying the lateral stretching of film 1.

On the returning reach of link members 50, guide means 22 is provided. The guide means 22 guide sliding elements 16, 16' in such a way that the links 10, 10' and 11, 11' will flare outwardly, thereby insuring the engagement of links with the chain gear 13.

Cam 23 (shown at the left in FIG. 1) is provided for engaging the lever 7 to raise the same to the position shown in dotted lines in FIG. 2. The lever 7 falls by its own weight when the lever 7 is disengaged from the cam 23 and nipping element 6 engages the top surface of the film 1 at the side edge thereof whereby the film is secured between the elements 6 and the stands 5. At the outgoing end there is provided a cam 24, for engaging the levers 7 to raise the same to release the film 1.

In operation of the apparatus of the invention in FIG. 1, the side edges of film 1 travelling into the heating chamber 25 in the direction as shown by arrow "a," enters between the nipping element 6 of holding means 4 opened by the cam 23 and the stand 5, and lever 7 being urged upwardly by cam 23. The lever 7 disengages from cam 23 and falls by its own weight to engage the film edge between the stand 5 and element 6 (FIG. 2). The links 10, 10' and 11, 11' move on the base frame 3, and while clamping the film 1 by the holding means 4, are pushed by chain gear 13 at the incoming end and pulled by chain gear 12 at the outgoing end. As the distance between the right and left base frames 3 becomes increasingly wider toward the outgoing side, film 1 is stretched laterally (perpendicularly to direction of travel of film 1) as its travel advances.

The distance between pivots 8 of link members 50 increases as sliding elements 16, 16' are guided in a narrowing sense by guide rails 17, 17'. Thereby the clamped film is subjected to a longitudinal stretching operation.

Film 1 on the outgoing end near the exit is released concurrently with the opening of lever 7 of the holding means 4 by means of the cam 24 and pulled out of the heat chamber 25 by cooling roll 2. The sliding elements 16, 16' on the lower part of pivots 15, 15' of link joint slide on the guide rail 17, 17'. On the returning side of link members 50, the link members 50 fed out by chain gear 12 on the outgoing end return to the incoming end gradually being flared, and after being fully opened by guide means 22 are engaged with chain gear 13 at the incoming side.

The stretching rate is a function of the distance between adjacent holding means 4. The longitudinal stretching rate may be adjusted by rotating the handle 20 thereby varying the relative angle of the guide rais 17, 17', so that even during operation, easy and continuous regulation is feasible. However, it is necessary to set the speed at the outgoing end in accordance with the rotation of the handle 20, simultaneously adjusting the speed of revolution of the cooling roll 2.

The lateral stretching rate may be regulated by turning the handle 21, thus altering the relative angles between the right and left base frames 3 by suitable adjusting equipment (not shown).

According to this structure, film is subject to sure and reliable stretching operation in longitudinal and lateral directions concurrently, being clamped by the holding means 4 during travel through the heating chamber 25.

In the above mentioned embodiment, the link members 50 are illustrated as being horizontal but they can be arranged vertically as well. Such vertical link members are shown in FIG. 4 as 50a. Film 1 travels along being carried by pins 37 on holding means 29 positioned on one end of connecting pin 28 for links 26, 27. On the other end of the connecting pin 28, guide element 30 is engaged in guide rail 31 to resist the tension caused by the lateral stretch of the film 1, at the same time, while being guided by the guide rail 31. Other connecting pins 32 of link member 50a have on opposite ends thereof guide strips 33 engaging with guide rail 34 so as to be guided by guide rails 34. As the distance between the guide rails 34 is decreased in the direction of the travel of link members 50a, the pitch of adjacent connecting pins 28 increase in the direction of travel of film 1, and thereby the film 1 is stretched longitudinally. Lateral stretch of the film may be obtained in a similar arrangement as discussed above with respect to FIG. 1 by gradually flaring the distance between the opposed right and left base frames 3.

FIG. 5 shows another embodiment of the invention, which, in comparison with the structure of FIG. 2, differs in that a sliding element 35 is provided also in the lower part of the central pivot 8 carrying the film holding means.

Though film holding means are shown in FIG. 2, as consisting of a stand 5 and a lever 7, this is merely one illustration, and holding means may consist of pins 37 as shown in FIGS. 4 and 5.

In the above mentioned embodiments, link members 50 or 50a forming an endless chain loop are shown as consisting a four joints of links 10, 10' and 11, 11' which are in pantograph or diamond shape, but as shown in FIG. 6, it may be formed with link members 60 connected by suitable pivots 61 to form an endless chain loop. In this case, a number of links are connected in zigzag form so that arrays of link members will be capable of extension and contraction, that is, capable of changing the pitch of the pivots connecting the links. The array of links adjacent the side edges of film 1 is actuated so that the distance between the adjacent pivots 61 is made smaller at the incoming end and is increased towards the outgoing end. The endless chain loop configuration of FIG. 6 may be obtained by the guide means shown in FIG. 1. As an alternative, said chain loop may be driven by chain gears 12 and 13 without need for the two guide rails which are outwardly flared relative to the travelling direction of film as shown in FIG. 1. The lines joining the centers of the chain gears 12 and 13 are outwardly flared in relation to the travel direction of film 1, so that, the distance between pivots of the links of said endless chain loop are increased in the travel direction of the film by said revolution speed difference between the chain gears 12 and 13. Hence, in this case, the chain gears 12 and 13 operate as guide means for guiding the links as well as driving them. The holding means for the side edge of the film may be positioned at the pivots adjacent the film side, and, as explained in FIG. 1 perform a longitudinal stretch of the film in accordance with the gradual elongation of the pivots of the link as well as a lateral stretch of the film in accordance with the oblique relation of the links to the travelling direction of film 1.

In the case of a single joint link, it is preferable to use rotating levers 37, 38 for holding the link on the returning side of links so that the links leaving chain gear 12 which are almost straight are alternatively urged laterally to be folded in layers and returned to the chain gear 13 at the incoming end.

Furthermore, in this case too, in order to guide each pivot 61 of the array of links, such guide means as explained relating to apparatus in FIG. 1 can be provided, thereby ensuring subsequent longitudinal expansion of the link as well as the regulation of the longitudinal stretch rate of the film.

It is to be understood that various modifications and changes may be performed without departing from the spirit of this invention as defined in the appended claims.

What we claim is:

1. Apparatus as claimed in claim 4 comprising pivots interconnecting the links to form successive quadrilaterals.

2. Apparatus as claimed in claim 4 comprising pivots interconnecting the links end-to-end in a single line of links in a closed loop.

3. Apparatus as claimed in claim 4 comprising base frames supporting respective pairs of gears, chain loops and guide rails, and means supporting the base frames for relative angular adjustment to vary the degree of stretching of the strip of film.

4. Apparatus for longitudinally and transversely stretching a longitudinally advancing film comprising interconnected links in the form of an expandable and contractable flexible endless chain loop on either side of the advancing film, holding means supported on the links of the chain loops for engaging the advancing film along the sides thereof over substantially the entire length of the portion of the chain loop adjacent the film, chain driving means engaging each of the chain loops in driving relation and respectively including a gear driven at a relatively low speed and a gear driven at a relatively high speed, said gears for the chain loops being located on opposite sides of the film along lines diverging with respect to the longitudinal direction of advancement of the film, the gears driven at higher speed being located downstream of the gears driven at lower speed, guide means for respective chain loops engaged respectively with a portion of the associated loop and extending along diverging paths in the direction of advancement of the film for adjustably expanding and contracting the loops in relation with the driven speeds of the gears, the guide means for each loop including a pair of adjustably spaced guide rail members extending convergently along the path of the respective guide means and adjusting means for adjusting the relative angular position of the guide rails of the respective pairs for in turn expanding or contracting the portion of the chain loop with which the guide means is engaged, said adjusting means comprising a spherical bushing rotatably supported in each of the rails and a rod threadably engaged with the bushings for moving the rails at the locations of the bushings relative to one another, said bushings having threaded openings of opposite hand, said rod including threaded portions of opposite hand engaged in corresponding threaded openings of the bushings such that the rails move relative to one another in opposite directions in dependence upon the direction of turning of the rod.

5. Apparatus as claimed in claim 4 wherein said guide rails include channel portions, the apparatus comprising pivots connecting the links together and slide members guidably supported for sliding movement in the channel portions of the guide rails and connected with an associated pivot to constrain the same to move in a path corresponding to the guide rail for selectively expanding and contracting the chain loops.

References Cited by the Examiner

UNITED STATES PATENTS

| 2,755,533 | 7/56 | Miller. | |
| 2,923,966 | 2/60 | Tooke | 18—1 |
| 3,055,048 | 9/62 | Koppehele | 18—1 |
| 3,078,504 | 2/63 | Koppehele | 18—1 X |
| 3,148,409 | 9/64 | Brucker | 18—1 |

FOREIGN PATENTS 1,111,812   7/61   Germany.

WILLIAM J. STEPHENSON, *Primary Examiner.*